(12) United States Patent
Loreaux et al.

(10) Patent No.: US 9,083,084 B2
(45) Date of Patent: Jul. 14, 2015

(54) PASSIVE ELECTROMAGNETIC WAVE REFLECTOR FOR MEASURING LOCAL STRAIN IN A STRUCTURE ON THE EARTH'S SURFACE

(75) Inventors: Philippe Loreaux, L'Hay les Roses (FR); Guillaume Quin, Antony (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 0 days.

(21) Appl. No.: 13/981,287

(22) PCT Filed: Jan. 23, 2012

(86) PCT No.: PCT/EP2012/050927
§ 371 (c)(1), (2), (4) Date: Jul. 23, 2013

(87) PCT Pub. No.: WO2012/101072
PCT Pub. Date: Aug. 2, 2012

(65) Prior Publication Data
US 2013/0298689 A1 Nov. 14, 2013

(30) Foreign Application Priority Data
Jan. 25, 2011 (FR) .................................... 11 50564

(51) Int. Cl.
*H01Q 15/18* (2006.01)
*H01Q 15/16* (2006.01)
*H01Q 15/14* (2006.01)
*G01L 1/25* (2006.01)

(52) U.S. Cl.
CPC ..... *H01Q 15/18* (2013.01); *G01L 1/25* (2013.01); *H01Q 15/14* (2013.01); *H01Q 15/16* (2013.01)

(58) Field of Classification Search
CPC ...... E21B 49/006; H01Q 15/14; H01Q 15/18; H01Q 15/16
USPC ............................................. 73/784; 343/915
See application file for complete search history.

(56) References Cited

U.S. PATENT DOCUMENTS

| 3,324,470 | A  | * | 6/1967 | Morse ........................... 342/353 |
| 6,570,545 | B1 | * | 5/2003 | Snow et al. ................... 343/915 |
| 6,784,825 | B1 | * | 8/2004 | Kubota et al. ...................... 342/5 |
| 2003/0107519 | A1 |  | 6/2003 | Snow |
| 2013/0011019 | A1 |  | 1/2013 | Beth et al. |

FOREIGN PATENT DOCUMENTS

| CA | 2 425 073 A1 | 10/2004 |
| DE | 31 19 180 A1 | 12/1982 |
| FR | 2 948 188 A1 | 1/2011 |

OTHER PUBLICATIONS

International Search Report, PCT/EP2012/050927, Dated Jun. 26, 2012.

* cited by examiner

*Primary Examiner* — Lisa Caputo
*Assistant Examiner* — Octavia Hollington
(74) *Attorney, Agent, or Firm* — Nixon Peabody LLP

(57) ABSTRACT

A passive electromagnetic wave reflector for measuring, from a satellite, local strain in a structure located on the Earth's surface, characterized in that it comprises a substantially vertical, relative to the Earth's surface, planar element, the planar element having a rectilinear side making contact with the structure the strain of which is to be measured, said element being aligned with the axis of the Earth's poles, and, fixed to the planar element, a mechanical structure having a first part located on a first side of the planar element and a second part located on a second side of the planar element, opposite the first side, the mechanical structure forming a rectilinear edge that, in combination with the rectilinear side of the planar element, forms a means for holding in position the reflector on the structure the strain of which is to be measured.

5 Claims, 4 Drawing Sheets

PASSIVE ELECTROMAGNETIC WAVE REFLECTOR FOR MEASURING LOCAL STRAIN IN A STRUCTURE ON THE EARTH'S SURFACE

CROSS REFERENCE TO RELATED APPLICATIONS OR PRIORITY CLAIM

This application is a National Phase of PCT/EP2012/050927, filed Jan. 23, 2012, entitled, "PASSIVE ELECTRO-MAGNETIC-WAVE REFLECTOR FOR MEASURING LOCAL STRAIN IN A STRUCTURE ON THE EARTH'S SURFACE", which claims the benefit of French Patent Application No. 11 50564, filed Jan. 25, 2011, the contents of which are incorporated herein by reference in their entirety.

TECHNICAL FIELD AND PRIOR ART

The present invention relates to a passive electromagnetic wave reflector for measuring local strain in a structure located on the Earth's surface.

Passive electromagnetic wave reflectors, also called radar reflectors or permanent scatterers, are used for measuring the strain of soils and objects placed on the Earth's surface.

An electromagnetic wave is sent, from a satellite, to a radar reflector located on the Earth's surface. The electromagnetic wave reflected by the radar reflector is then set back to the satellite. The measurement of the strain is carried out, in the direction of sighting of the satellite, using images taken at successive dates. The strain measurement can attain submillimetric precision.

Four different sighting modes of the satellite are used to measure strains. FIGS. 1-4 represent these four modes:

FIG. 1 represents the ascending mode with right sighting,

FIG. 2 represents the ascending mode with left sighting,

FIG. 3 represents the descending mode with right sighting, and

FIG. 4 represents the descending mode with left sighting.

As is shown in FIGS. 1-4, the ascending or descending mode is defined depending on whether the path of the satellite S "ascends" or "descends" the North-South axis of the Earth T and the right or left sighting is defined by the orientation of the beam F that the satellite transmits in relation to the plane defined by the path of the satellite.

Radar reflectors exist in the natural state or the artificial state. In the natural state, radar reflectors are most often encountered in human infrastructures. In regions devoid of human infrastructures or poorly equipped with such infrastructures, radar reflectors in the artificial state are quite particularly designed to measure strains.

Most known radar reflectors generally have a cube corner shape, the cube corner being positioned in a manner adapted to an image being taken by satellite. To this end, the main diagonal of the cube corner is, preferably, directed towards the satellite. This orientation of the cube corner in relation to the satellite limits the taking of useful images, both on account of the path of the satellite and on account of the image taking mode of the satellite. These reflectors are thus dedicated to one satellite and to one sighting mode, ascending or descending.

The radar reflector of the invention does not have this drawback.

DESCRIPTION OF THE INVENTION

In fact, the invention relates to a passive electromagnetic wave reflector for measuring local strain in a structure located on the Earth's surface, the reflector being able to reflect, to a satellite in orbit around the Earth, an electromagnetic wave that it receives from said satellite. The passive reflector comprises:

a planar element substantially vertical relative to the Earth's surface, the planar element having a rectilinear side making contact with the structure located on the Earth's surface and aligned with the axis of the Earth's poles, and fixed to the planar element, a mechanical structure having a first part located on a first side of the planar element and a second part located on a second side of the planar element, opposite the first side, the mechanical structure forming, on either side of the planar element, a rectilinear edge, the rectilinear edge and the rectilinear side being substantially located in a same plane perpendicular to the plane defined by the planar element and forming a means for holding in position the reflector on the structure, the first part of the mechanical structure and the second part of the mechanical structure being able, each, to reflect in the direction of the satellite the electromagnetic wave that it receives from the satellite.

Unlike existing passive radar reflectors, the passive radar reflector of the invention is advantageously visible by all satellites, whatever the image taking mode of the satellite. It makes it possible to measure vertical and horizontal strains along the sighting axis of the satellite.

BRIEF DESCRIPTION OF DRAWINGS

Other characteristics and advantages of the invention will become clear in light of the embodiments made with reference to the appended figures, among which.

DETAILED DESCRIPTION OF THE PREFERENTIAL EMBODIMENT OF THE INVENTION

Figure 1:
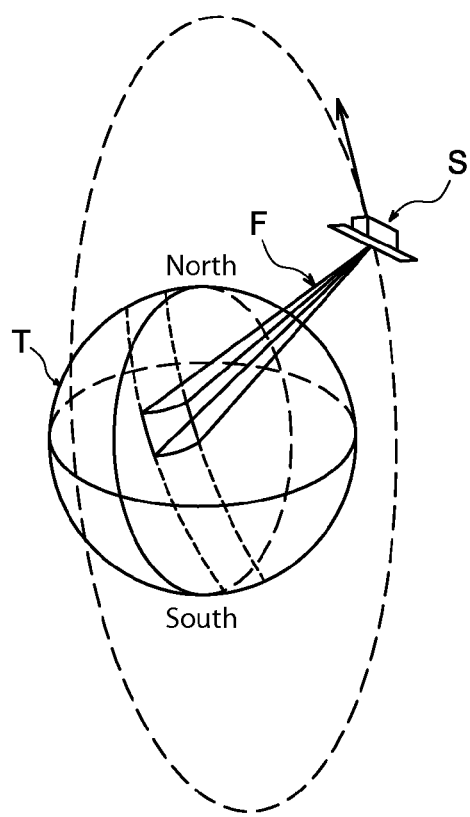
FIGS. 1 to 4 already described represent the four different sighting modes of a satellite that are used to measure strains.
Figure 2:
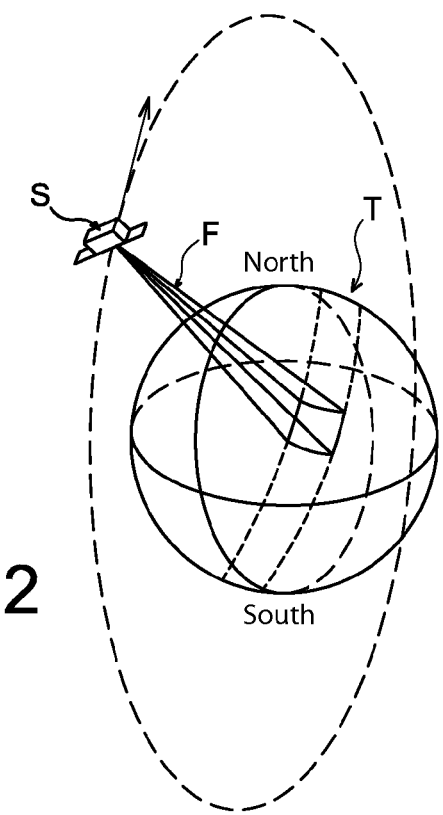
Figure 3:
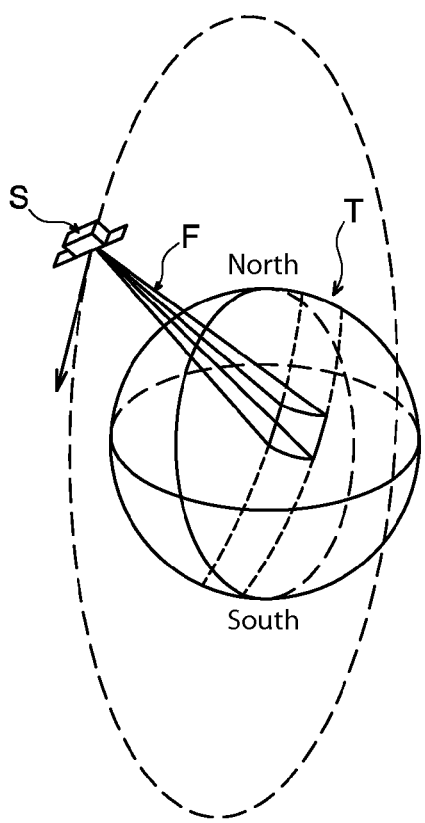
Figure 4:
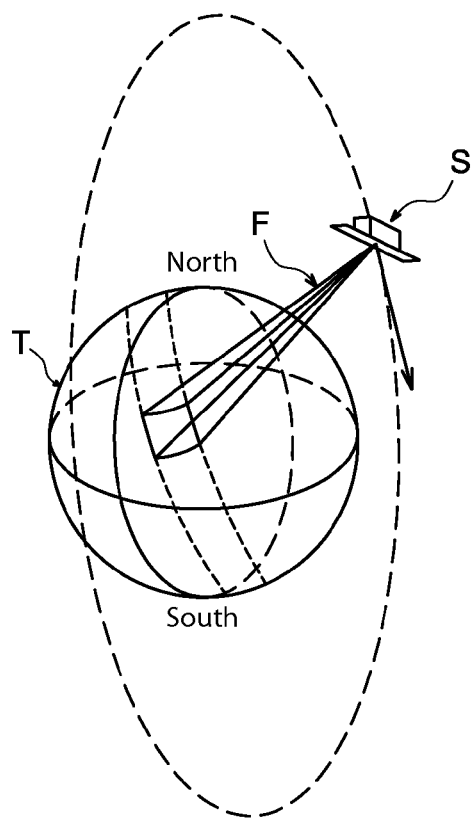
Figure 5:
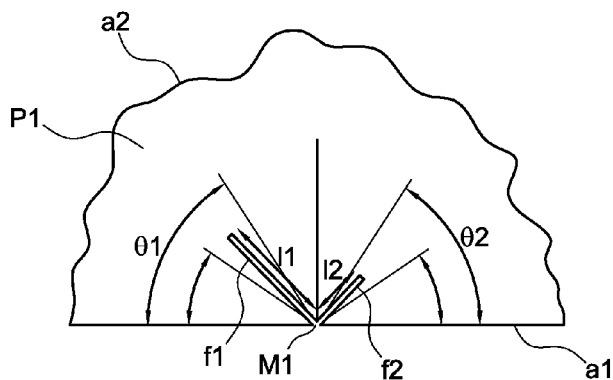
FIGS. 5-7 represent constituent elements of a reflector according to the preferential embodiment of the invention and the reflector obtained by the association of said constituent elements.

The reflector according to the preferential embodiment of the invention comprises three flat elements or plates P1, P2, P3. FIG. 5 represents the plate P1 and FIG. 6 the plates P2 and P3.

The plate P1 has a rectilinear side a1 and a side a2 of any shape which delimits a flat angular sector opposite the rectilinear side a1. Two rectilinear openings in the form of slits f1, f2 are made in the plate P1 from a same point M located on the side a1. In a preferential manner, the slits are at 90° to each other and each form an angle of 45° with the side a1. In a more general manner however, the angles $\theta_1$, $\theta_2$ that the respective slits f1, f2 form with the side a1 are located freely between 35° and 55° ("freely" is taken to mean that the slits f1, f2 are then no longer "linked" by an angle of 90° between them). The slit f1 has a length l1 and the slit f2 has a length l2.

Figure 6:
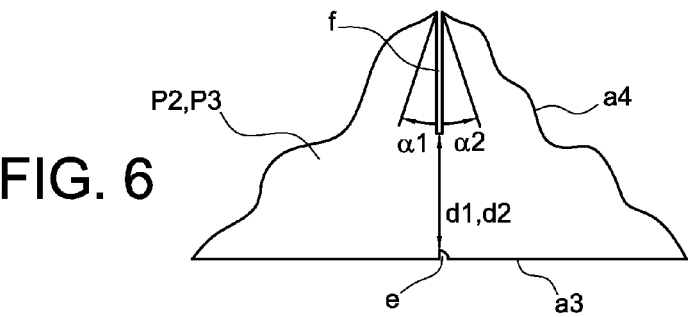

FIG. 6 represents the plates P2 and P3. Each plate P2, P3 has a rectilinear side a3 and a side a4 of any shape which delimits a flat angular sector. A rectilinear opening in the form of slit f is made in each plate P2, P3 from the side a4. The axis of the slit f is perpendicular to the rectilinear side a3. For the plate P2, the distance d1 that separates the slit f from the rectilinear side a3 is equal to the length l1 of the slit f1. In the same way, for the plate P3, the distance d2 that separates the slit f from the rectilinear side a3 is equal to the length l2 of the slit f2.

Figure 7:
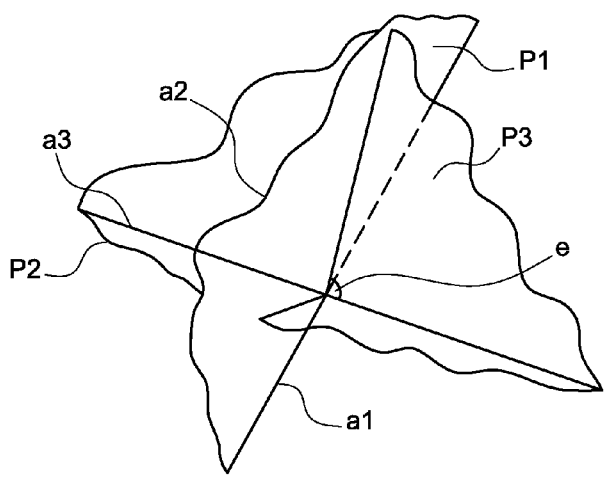

FIG. 7 represents the reflector of the invention that results from the assembly of the plates P1, P2 and P3. The plates P1 and P2 are interleaved with each other, as well as the plates P1 and P3. To this end, the slit f of the plate P2 and the slit f1 of the plate P1 are positioned one in the other, up to their end, and aligned and the slit f of the plate P3 and the slit f2 of the plate P1 are also positioned one in the other, up to their end, and aligned. It results from this assembly that the two rectilinear sides a3 of the plates P2 and P3 are in contact with each other and define an edge that forms, in combination with the side a1, a means for holding in position the reflector on the ground. The reflector of the invention is thus advantageously self-supporting. Laid on the ground, the reflector of the invention thus does not require any particular infrastructure. It suffices that the location on the ground of which the strains are to be monitored has a surface area equivalent to that defined by the sides a1, a3. When the reflector is placed on the ground, the plate P1 is substantially vertical. In order that the reflector is visible from all satellites, the side a1 is aligned with the axis of the geographic poles.

Once fixed to the plate P1, the plates P2 and P3 define a mechanical structure forming two cavities located on either side of the plate P1, each cavity being able to reflect, in the direction of the satellite, the electromagnetic wave that it receives from the satellite.

According to an improvement of the invention, a notch e is made on the edge a3 of each plate P2, P3, substantially in the alignment of the slit f, such that, once the reflector mounted, an orifice appears in the lower part of each cavity. It is then advantageously possible, for example, to evacuate rain water.

Figure 8:
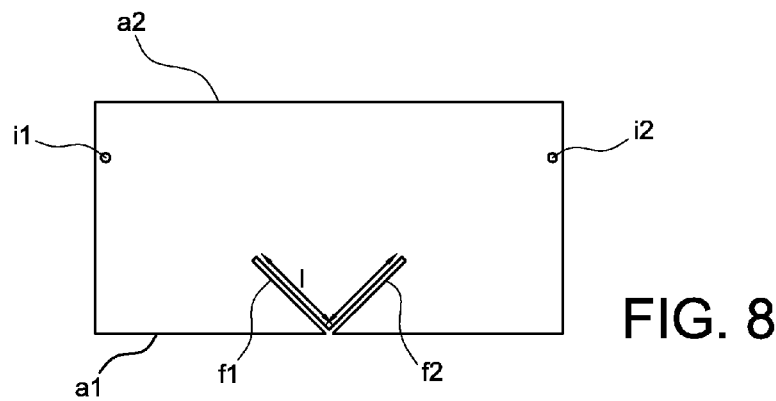
FIGS. 8-10 represent a particular embodiment of the reflector according to the preferential embodiment of the invention.
Figure 9:
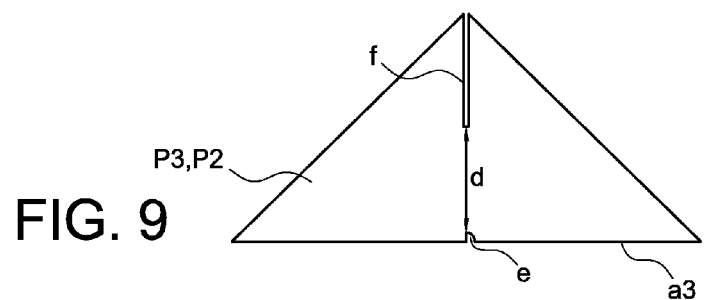
Figure 10:
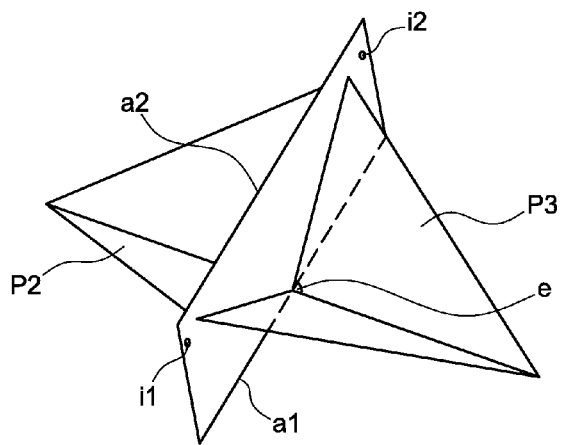

FIGS. 8 to 10 represent a particular embodiment of the preferential embodiment of the invention.

According to this particular embodiment, the plate P1 is rectangular with a large side and a small side, one of the two large sides forming the side a1, and the plates P1 and P2 form an isosceles triangle of which the base forms the side a3. The slits f1 and f2 have a same length l. They are positioned at 90° to each other and at 45° each in relation to the side a1. The distance d that separates the slit f from the base of the triangle is equal to the length l of the slits f1, f2.

According to an improvement, two through holes i1, i2 are provided on the plate P1 in order, if it proves to be necessary, to be able to fix to the ground the reflector by ties. According to another improvement, the reflector comprises a structure transparent to electromagnetic waves that surrounds the plates P1, P2, P3 in order to protect the plates from the aggressions of the environment.

The reflector of the invention has a large number of advantages, namely:
  it is passive and autonomous and thus does not require any electrical energy source to supply it, as is the case for GPS receivers (GPS for "Global Positioning System"),
  it is without particular upkeep and may be put in place for monitoring over several years,
  it is permanent and a tracking on each measuring point, often difficult to access, is not necessary as is the case of topographic techniques with optical sighting or GPS antenna,
  it is self-supporting and, consequently, does not require the construction of specific stable pillars, as is the case for topographic or GPS techniques,
  it may be used in contexts of monitoring soft masses such as snow, ice or soft ground,
  it is easily transportable, which enables its installation in isolated, difficult to access places,
  it is not expensive, which makes it possible to put in place a large number of devices in a same zone, thereby making it possible to carry out a large number of measurements in said zone,
  it is visible from any type of satellite, whatever the frequency thereof, thereby make it possible:
    a) to carry out very precise strain measurements (a sub-millimetric precision may be obtained with satellites that work in X-band (8-12 GHz)) and,
    b) to work with an important recurrence, which is advantageous in the case of a rapidly changing strain (in this case, all of the images of a same zone that are acquired by the different satellites are analysed with the same reference on the ground),
  it is rustic and, as a result, it is not subject to curiosity that could lead to malevolent acts by passers-by (degradations or theft).

The invention finds applications in numerous fields such as, for example, civil engineering and Earth sciences.

The civil engineering applications are, for example:
  the monitoring of structures such as dams, bridges, buildings, dykes, artificial islands, road embankments, railways, etc.,
  the stability monitoring of coastal cliffs, coastlines, potholes,
  the surface evolution of former mining sites.

The Earth sciences applications are, for example:
  the measurement of before and after strains by an earthquake,
  the monitoring of the strain of volcanos, continental or tectonic subsidence, the evolution of faults and landslides,
  the monitoring of the advancement of glaciers and the evolution of firns on massifs with permanent snow coverage,
  the formation of a terrestrial stability reference point for calculating the hydro zero in ports,
  the study of sea beds by placing the radar reflector on sea beds (transposition of the radar imaging by satellite technique).

The invention claimed is:

1. A passive electromagnetic wave reflector for measuring local strain in a structure located on the Earth's surface, the reflector operable to reflect, to a satellite in orbit around the Earth, an electromagnetic wave received from said satellite, comprising:
  a first plate (P1) having a rectilinear side (a1) and configured to contact the structure located on the Earth's surface, and
  fixed to the first plate (P1), a mechanical structure (P2, P3) having second (P2) and third plates (P3) coupled to said first plate and sharing a common rectilinear edge (a3) that extends away from opposite sides of said first plate, the second plate (P2), the third plate (P3) and said first plate (P1) forming, on either side of said first plate, a cavity operable to reflect, in the direction of the satellite, the electromagnetic wave received from the satellite, the rectilinear edge (a3, a3) of the mechanical structure and the rectilinear side (a1) of said first plate being substantially located in a common plane perpendicular to a plane defined by said first plate and operable in combination to hold in position the reflector on the structure.

2. The passive electromagnetic wave reflector according to claim 1, wherein said first plate (P1) includes two rectilinear openings, in the form of first and second slits (f1, f2) diverging from a common point (M1) located on the rectilinear side (a1) of said first plate, on either side of an axis perpendicular to said rectilinear side, each slit being aligned with an axis forming an angle between 35° and 55° in relation to said perpendicular axis, the first slit (f1) having a first length (l1) and the second slit (f2) having a second length (l2), the second plate (P2) having a side which delimits a flat angular sector opposite the shared common rectilinear edge and the third plate (P3) having a side which delimits a flat angular sector opposite the shared common rectilinear edge, a rectilinear opening in the form of a third slit formed in the second plate, the third slit extending from a side of the second plate opposite the shared common rectilinear edge and ending at a distance from the shared common rectilinear edge that is substantially equal to the length of the first slit, a rectilinear opening in the form of a fourth slit formed in the third plate, the fourth slit extending from a side of the third plate opposite the shared common rectilinear edge and ending at a distance from the shared common rectilinear edge that is substantially equal to the length of the second slit, the axis of each of the third and fourth slits being perpendicular to the common rectilinear edge, the third slit being positioned up to its end in the first slit of said first plate and aligned with said first slit, and the fourth slit being positioned up to its end in the second slit of said first-plate and aligned with said second slit.

3. The passive electromagnetic wave reflector according to claim 2, wherein the axis of the first slit (f1) and the axis of the second slit (f2) form, each, an angle of 45° with the axis perpendicular to the rectilinear side of said first plate and the lengths (l1, l2) of the first and second slits are substantially equal.

4. The passive electromagnetic wave reflector according to claim 2, wherein a notch (e) is made on the rectilinear side of each second and third plate, substantially in the alignment of the axes of the third and fourth slits, respectively.

5. The passive electromagnetic wave reflector according to claim 1, wherein through holes (i1, i2) are provided in said first plate (P1) in order to enable a fixation of the reflector on the structure.

* * * * *